United States Patent [19]
Kanai

[11] Patent Number: 4,621,830
[45] Date of Patent: Nov. 11, 1986

[54] AUTOMOTIVE SUSPENSION SYSTEM

[75] Inventor: Seita Kanai, Hiroshima, Japan

[73] Assignee: Mazda Motor Corporation, Japan

[21] Appl. No.: 689,958

[22] Filed: Jan. 9, 1985

[30] Foreign Application Priority Data

Jan. 13, 1984 [JP] Japan .................................. 59-3671
Jan. 13, 1984 [JP] Japan .................................. 59-3672

[51] Int. Cl.$^4$ .............................................. B60G 3/04
[52] U.S. Cl. .................................. 280/675; 280/690;
280/716; 267/57.1 A
[58] Field of Search ............... 280/701, 725, 690, 700,
280/716, 717, 675; 267/63 R, 57.1 R, 57.1 A

[56] References Cited
U.S. PATENT DOCUMENTS

| | | | |
|---|---|---|---|
| 3,147,964 | 9/1964 | Wolf | 267/57.1 A |
| 3,892,284 | 7/1975 | Braess et al. | 280/663 |
| 4,139,246 | 2/1979 | Mikoshiba | 267/57.1 R |
| 4,269,432 | 5/1981 | Inoue et al. | 280/690 |
| 4,457,536 | 7/1984 | Rumpel | 280/663 |
| 4,513,990 | 4/1985 | Morita | 267/63 R |
| 4,530,514 | 7/1985 | Ito | 280/690 |
| 4,537,420 | 8/1985 | Ito | 280/700 |
| 4,542,920 | 9/1985 | Kiyima | 280/690 |

Primary Examiner—David M. Mitchell
Assistant Examiner—Karin L. Ferriter
Attorney, Agent, or Firm—Gerald J. Ferguson, Jr.;
James E. Bryan; Michael P. Hoffman

[57] ABSTRACT

An automotive suspension system comprises a wheel support for supporting a wheel, and a wheel supporting member for connecting the wheel support to the vehicle body. The wheel supporting member includes front and rear resilient bushings spaced from each other by a predetermined distance in the longitudinal direction of the vehicle body and the direction of the toe of the wheel is adapted to be changed according to the deformation of the front and rear bushings. The load-deformation characteristics of the front and rear bushings are selected so that the ratio of the amount of deformation of the front bushing for a given load to that of the rear bushing for the same load changes according to the magnitude of the side force acting on the wheel, thereby changing the steering characteristics according to the magnitude of the side force.

20 Claims, 15 Drawing Figures

AUTOMOTIVE SUSPENSION SYSTEM

BACKGROUND OF THE INVENTION

1. Field of the Invention

This invention relates to a suspension for a motor vehicle.

2. Description of the Prior Art

As disclosed in U.S. Pat. No. 4,269,432, there has been known an automotive suspension system which is arranged to cause rear wheels to toe in or to straighten the rear wheels when the side force acting on the rear wheels is relatively small in order to improve running stability during straight travel of the vehicle.

In the case of a front-engine-front-drive car, when a large side force acts on the rear wheels such as during sharp cornering, the grip of the driving wheels or the front wheels is weakened and understeer tendency is enhanced, thereby adversely affecting the steering performance.

Accordingly when the automotive suspension system disclosed in the aforesaid U.S. patent is directly applied to the front-engine-front-drive car in order to improve running stability during straight travel, the understeer tendency is further enhanced as the side force acting on the rear wheels increases and the steering performance of the vehicle tends to be unsatisfactory.

On the other hand, when the suspension system is arranged so that the rear wheels are caused to toe out when a large side force acts thereon in order to weaken understeer tendency, thereby improving the steering performance, the running stability during straight travel of the vehicle is adversely affected since the rear wheels tend to substantially toe out even when the side force acting on the rear wheels is relatively small.

In the case of a front-engine-rear-drive car, when a large side force acts thereon, the grip of the driving wheels or rear wheels is weakened, and the understeer tendency is extremely weakened, producing oversteer tendency, whereby the vehicle tends to make a sharp turn inwardly, that is, so-called reverse-steer occurs.

In the front-engine-rear-drive car, by enlarging the toe-in of the rear wheels, the reverse-steer can be prevented or suppressed when a large side force acts thereon. However, this approach is disadvantageous in that the understeer tendency is excessively enhanced when the side force acting on the vehicle is relatively small and the steering performance is significantly lowered.

SUMMARY OF THE INVENTION

In view of the foregoing observations and description, the primary object of the present invention is to provide an automotive suspension in which the running stability during straight-forward travel of the vehicle can be ensured when the side force acting thereon is relatively small and at the same time the steering performance can be improved when the side force acting thereon is increased.

In accordance with the present invention, there is provided an automotive suspension system comprising a wheel support for supporting a wheel, and a wheel supporting member for connecting the wheel support to the vehicle body wherein the wheel supporting member includes front and rear resilient supporting means spaced from each other by a predetermined distance in the longitudinal direction of the vehicle body and the direction of the toe of the wheel is adapted to be changed according to deformation of the front and rear resilient supporting means, the load-deformation characteristics of the front and rear resilient supporting means being selected so that the ratio of the amount of deformation of the front resilient supporting means for a given load to that of the rear resilient supporting means for the same load changes according to the magnitude of external forces acting on the wheel, thereby changing the steering characteristics in accordance with the magnitude of external force.

In the case that it is preferred that the degree of toe-in is to be reduced or it is preferred that the wheel is to be caused to toe out when the side force acting thereon is increased in order to weaken understeer tendency and thereby improve steering performance as in front-engine-front-drive cars, the spring characteristics of the front and rear resilient supporting means are selected so that the understeer tendency is weakened as the side force is increased. For example, when the suspension of the present invention is to be employed as a rear suspension of a front-engine-front-drive car, the spring characteristics of the front and rear resilient supporting means are selected so that the ratio of the amount of deformation of the front resilient supporting means to the amount of deformation of the rear resilient supporting means becomes smaller as the side force acting on the rear wheel increases.

In the case that it is preferred that the degree of toe-in is preferred to be increased when the side force acting on the wheel increases in order to enhance understeer tendency thereby preventing reverse-steer as in front-engine-rear-drive cars, the spring characteristics of the front and rear resilient supporting means are selected so that the understeer tendency is enhanced as the side force is increased. For example, when the suspension of the present invention is to be employed as a rear suspension of a front-engine-rear-drive car, the spring characteristics of the front and rear resilient supporting means are selected so that the ratio of the amount of deformation of the front resilient supporting means to the amount of deformation of the rear resilient supporting means becomes larger as the side force acting on the wheel increases.

DESCRIPTION OF THE PREFERRED EMBODIMENT

Figure 1:
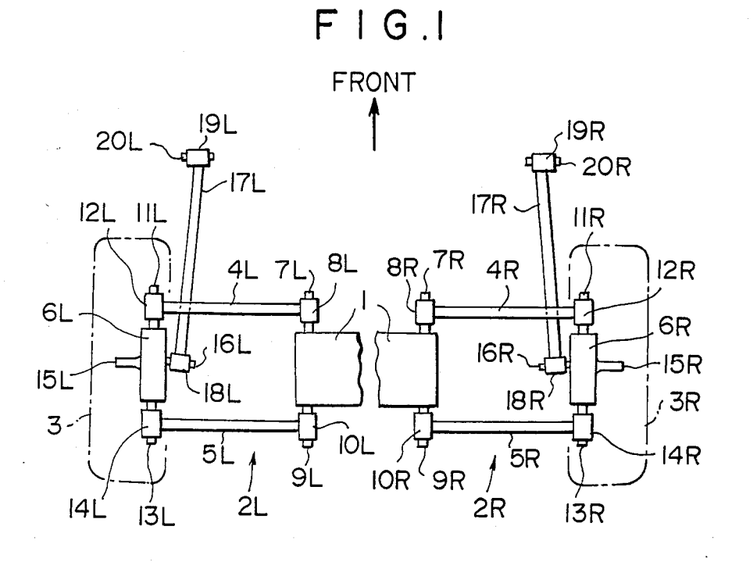
FIG. 1 is a schematic plan view of a rear suspension of a front-engine-front-drive car in accordance with a first embodiment of the present invention.

FIG. 1 is a schematic plan view of a rear suspension of a front-engine-front-drive car in accordance with first embodiment of the present invention. Since the suspensions for the right and left rear wheels are identical to each other in structure, hereinbelow description will be made only of the suspension for the right rear wheel, and instead of describing the suspension for the left rear wheel, the parts thereof are given the same reference numerals as the corresponding parts of the right rear wheel suspension but accompanied by the character "L" instead of the character "R".

In FIG. 1, reference numeral 1 denotes a sub-frame fixed to a vehicle body as a springing weight, and by the sub-frame 1 is supported for vertical movement a right rear wheel 3R by way of a right wheel supporting member 2R of a swing arm type. The wheel supporting member 2R comprises a front lateral link 4R and a rear lateral link 5R extending in the transverse direction of the vehicle body, and a connecting link 6R (as a wheel support) extending in the longitudinal direction of the vehicle body. The inner end portion of the front lateral link 4R is connected for pivotal movement to a shaft 7R, projecting forward from the frame 1, by way of a bushing 8R, and the inner end portion of the rear lateral link 5R is connected for pivotal movement to a shaft 9R, projecting rearward from the frame 1, by way of a bushing 10R. The outer end portion of the front lateral link 4R is connected for pivotal movement to a shaft 11R, projecting forward from the front end of the connecting link 6R, by way of a bushing 12R, and the outer end portion of the rear lateral link 5R is connected for pivotal movement to a shaft 13R, projecting rearward from the rear end of the connecting link 6R, by way of a bushing 14R. From the connecting link 6R projects a kingpin 15R, and the right rear wheel 3R is supported for rotation about the kingpin 15R.

The axes of the shafts 7R, 9R, 11R and 13R and the axes of the bushings 8R, 10R, 12R and 14R extend in the longitudinal direction of the vehicle body, and accordingly the right rear wheel 3R is supported for rotation up and down about the shafts 7R and 9R. A shaft 16R projects inwardly from the connecting link 6R, and to the shaft 16R is connected for pivotal movement a tension rod 17R by way of a bushing 18R to extend substantially in the longitudinal direction of the vehicle body therefrom. The front end portion of the tension rod 17R is connected for pivotal movement to a shaft 20R, projecting from the vehicle body, by way of a bushing 19R. The bushings 18R and 19R extend in the transverse direction of the vehicle body so that the rigidity of the wheel supporting member 2R in the longitudinal direction of the vehicle body is ensured by the tension rod 17R.

Figure 2:
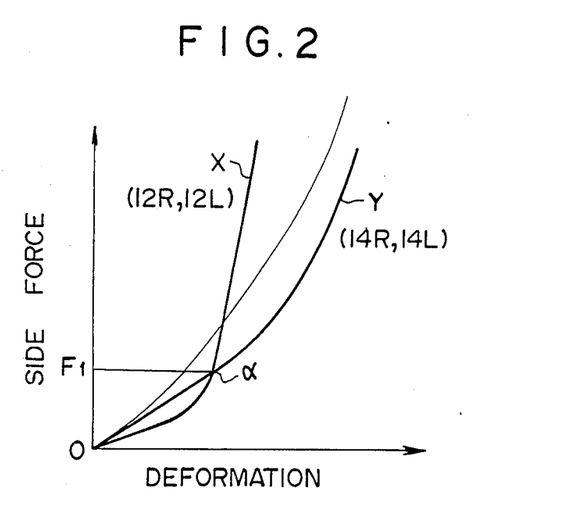
FIG. 2 shows the spring characteristics of the front and rear bushings employed in the suspension of FIG. 1.

Said bushing 12R for connecting the front lateral link 4R to the connecting link 6R and the bushing 14R for connecting the rear lateral link 5R to the connecting link 6R (the bushings 12R and 14R will be respectively referred to as "front bushing 12R" and "rear bushing 14R", hereinbelow, in order clearly distinguish from each other) differ from each other in spring characteristics. In this particular embodiment, the relation between the deformation of the front bushing 12R and the magnitude of the side force acting on the rear wheel 3R is set as shown by line X in FIG. 2, and the relation between the deformation of the rear bushing 14R and the magnitude of the side force acting on the rear wheel 3R is set as shown by line Y in FIG. 2. That is, the spring characteristics of the rear bushing 14R are substantially linear while that of the front bushing 12R are nonlinear. The spring characteristic curves X and Y of the front and rear bushings 12R and 14R intersect with each other at an intersection indicated at α. As can be understood from FIG. 2, when the side force acting on the rear wheel 3R is relatively small, i.e. smaller than the value F1 corresponding to the intersection α, the front bushing 12R is deformed by a larger amount than the rear bushing 14R, while when the side force acting on the rear wheel 3R exceeds the value F1, the rear bushing 14R is deformed by a larger amount than the front bushing 12R. The bushings 8R and 10R have substantially the same spring characteristics.

Figures 3, 13:
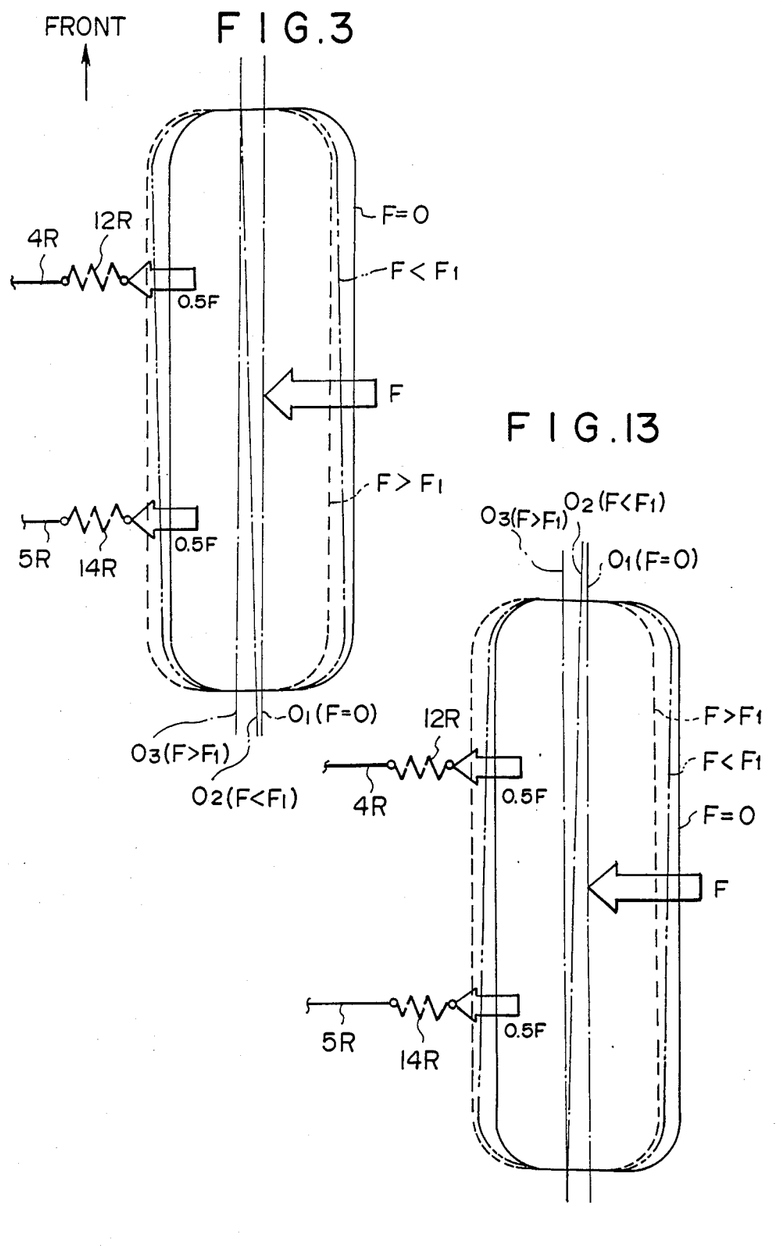
FIG. 3 is a schematic view illustrating the behavior of the right rear wheel of the rear suspension of FIG. 1 with the change in magnitude of the side force acting thereon.
FIGS. 12 to 15 are views similar to FIGS. 2, 3, 10 and 11 respectively but relating to the second embodiment of the present invention.

FIG. 3 shows the behavior of the right rear wheel 3R or the change in position of the right rear wheel 3R with the change in magnitude of the side force acting thereon due to the difference in spring characteristics between the front bushing 12R and the rear bushing 14R. In FIG. 3, the side force acting on the rear wheel 3R is indicated at F, and the positions of the rear wheel 3R when the side force is zero, when the side force is smaller than the value F1 and when the side force is larger than the value F1 are shown respectively by the solid line, the chained line and the dotted line in FIG. 3. In FIG. 3, O1, O2 and O3 respectively denote positions of the central axis (in the direction of width of the wheel) of the rear wheel 3R when the side force is zero, smaller than the value F1 and larger than the value F1. In FIG. 3, the front and rear bushings 12R and 14R are schematically represented by spring-shapes. In this embodiment, the dimensions of the parts are selected so that the side force acting on the rear wheel 3R acts uniformly on the front and rear bushings 12R and 14R.

As can be understood from FIG. 3, when the side force is zero, the rear wheel 3R is directed straight-forward. When the side force F is smaller than the value F1, the rear wheel 3R is caused to toe in, thereby ensuring running stability during straight-forward travel, since the front bushing 12R is deformed by a larger amount than the rear bushing 14R as described above. When the side force F is larger than the value F1, the rear bushing 14R is deformed by a larger amount than the front bushing 12R and accordingly the degree of toe-in is reduced as compared with the same when the side force is smaller than the value F1, whereby the driving stability is improved. That is, a large side force F acts on the right rear wheel 3R during cornering to the left and accordingly the understeer tendency is weakened by reducing the degree of toe-in so that the vehicle can quickly turn in response to operation of the steering wheel.

Figure 4:
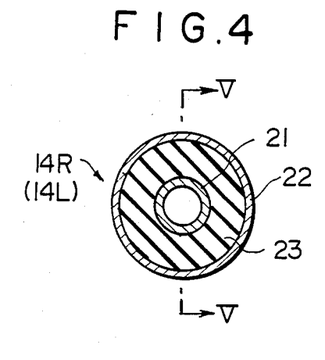
FIG. 4 is a cross-sectional view showing an example of a bushing which can be employed as the rear bushing in the first embodiment and as the front bushing in a second embodiment of the present invention.
Figure 5:
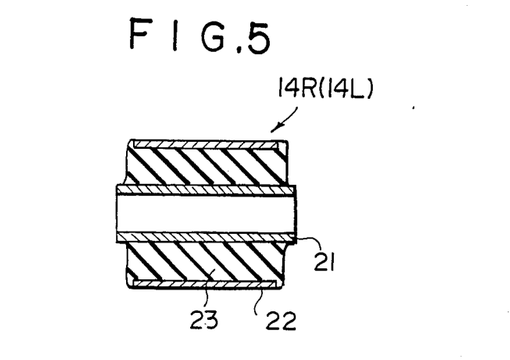
FIG. 5 is a cross-sectional view taken along line V—V in FIG. 4.
Figure 6:
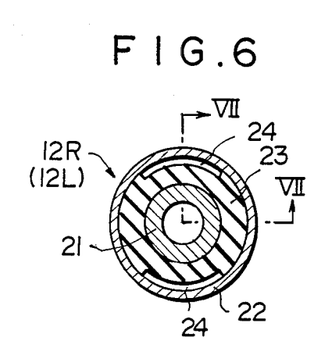
FIG. 6 is a cross-sectional view showing an example of a bushing which can be employed as the front bushing in the first embodiment and as the rear bushing in the second embodiment.
Figure 7:
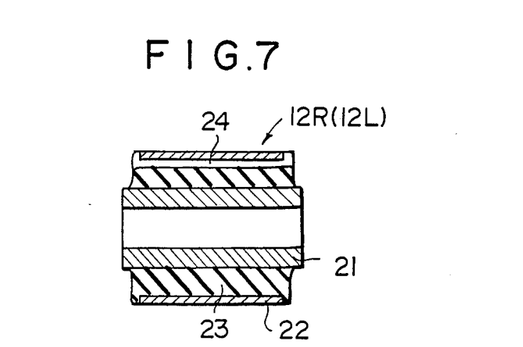
FIG. 7 is a cross-sectional view taken along line VII—VII in FIG. 6.
Figure 8:
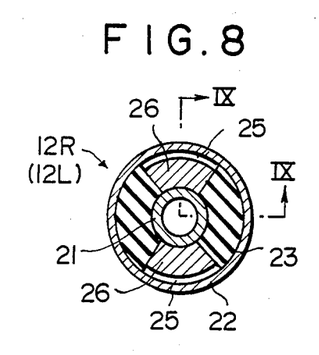
FIG. 8 is a cross-sectional view showing another example of a bushing which can be employed as the front bushing in the first embodiment and as the rear bushing in the second embodiment.
Figure 9:
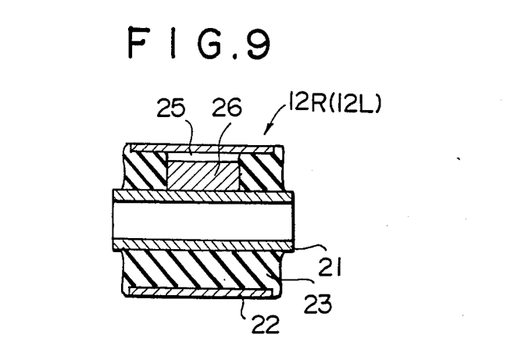
FIG. 9 is a cross-sectional view taken along line IX—IX in FIG. 8.

FIGS. 4 and 5 show an example of the rear bushing 14R having the spring characteristics described above. FIGS. 6 and 7 show an example of the front bushing 12R having the described spring characteristics and FIGS. 8 and 9 show another example of such front bushing 12R. The front and rear bushings 12R and 14R each basically comprises an inner tubular member 21 into which the shaft 11R or 13R is inserted, an outer tubular member 22 to which the lateral link 4R or 5R is connected, and a rubber material 23 between the inner and outer tubular members 21 and 22. More particularly, in the rear bushing 14R shown in FIGS. 4 and 5, the space between the inner and outer tubular members 21 and 22 is wholly filled with the rubber material 23. In the front bushing 12R shown in FIGS. 6 and 7, the wall thickness of the inner tubular member 21 is larger than that of the rear bushing 14R shown in FIGS. 4 and 5, and a pair of diametrically opposed recesses 24 is formed in the outer peripheral surface of the rubber material 23 to extend over the entire length of the rubber material 23. In the front bushing 12R shown in FIGS. 8 and 9, a pair of opposed central spaces 25 is formed in the rubber material 23. The central spaces 25 are free from rubber material from the outer surface of the inner tubular member 21 to the inner surface of the outer tubular member 22. Into each central space 25 is inserted a synthetic resin body 26 which is harder than the rubber material 23. The synthetic resin body 26 is bonded to the inner tubular member 21 but spaced from the outer tubular member 22.

Figure 10:
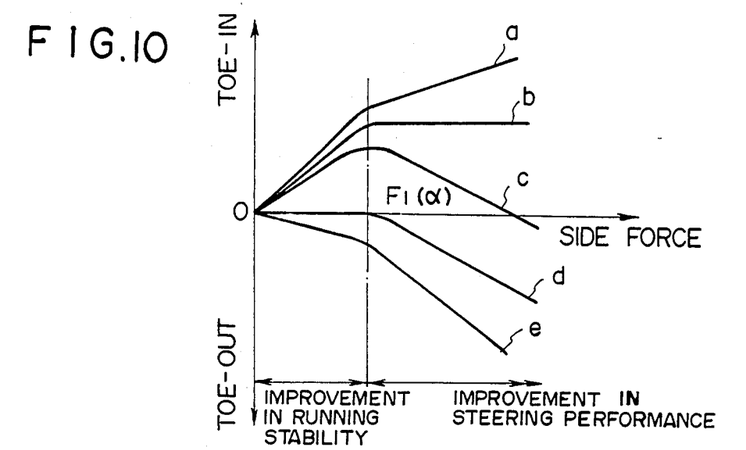
FIG. 10 shows the relation between the change in position of the rear wheel and the running stability during straight-forward travel, and the relation between the position of the rear wheel and the steering performance.

The relation between the change in position of the rear wheel 3R (i.e. the position of the rear wheel concerning toe-in or toe-out) and the running stability during straight-forward travel, and the relation between the position of the rear wheel 3R and the steering performance will be described, hereinbelow, with reference to FIG. 10. In FIG. 10, characteristic curves a to e respectively show positions of the rear wheel 3R for different spring characteristics of the front and rear bushings 12R and 14R, F1 being the magnitude of the side force F corresponding to the intersection α in FIG. 2. As can be understood from FIG. 10, when the side force acting on the rear wheel 3R exceeds the value F1, the amount of change in position of the rear wheel 3R in the direction of toe-in (in which the understeer tendency is weakened) varies so that the degree of toe-in is smaller when the side force F is large than when the side force F is small. Any one of the characteristic curves a to e may be employed. When the characteristic curve a is employed, the running stability during straight-forward travel is highly improved and thereby a car suitable for family use can be obtained. On the other hand, when the characteristic curve e is employed, the steering performance is improved more than the running stability, that is, the characteristic curve e is suitable for a sporty type car.

Figure 11:
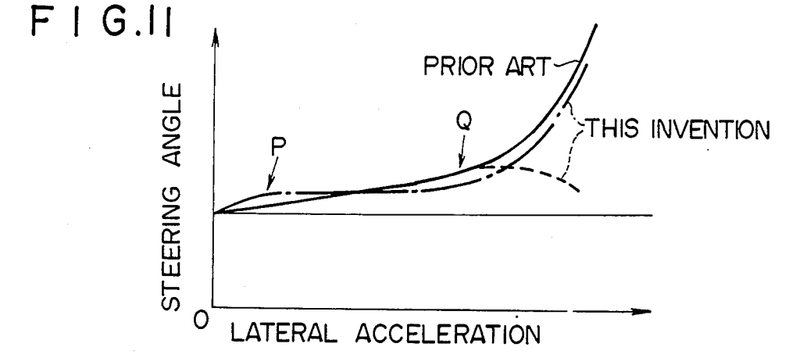
FIG. 11 shows the relation between the steering angle and the steering following properties.

FIG. 11 shows the relation between the steering angle and the steering following properties (represented by the magnitude of the lateral acceleration) for different values of F1, the solid line representing the relevant relations of a conventional front-engine-front-drive car, the chained line and the dotted line respectively representing the relevant relations of different front-engine-front-drive cars in accordance with two embodiments of the present invention. In the case of the chained line, the value F1 is selected to be on point P so that the steering performance is improved. On the other hand, in the case of the dotted line, the value F1 is selected to be on point Q so that the steering performance near the limit of front-engine-front-drive cars is improved.

The concept of this embodiment can be also applied to front suspensions. In this case, the relation between the spring characteristics of the front bushing and that of the rear bushing is reversed. Further, the concept of this embodiment can be applied to vehicles other than front-engine-front-drive cars so long as understeer tendency is enhanced as the side force acting on the wheel increases.

A second embodiment of the present invention will now be described with reference to FIGS. 12 to 15. The suspension of this embodiment is identical to the suspension of the first embodiment in basic arrangement except that the spring characteristics of the front bushing and the rear bushing are reversed, and therefore the basic arrangement of the suspension of this embodiment will not be described here, and in the following description, the same reference numerals are used for denoting the parts corresponding to those in the first embodiment.

Figure 12:
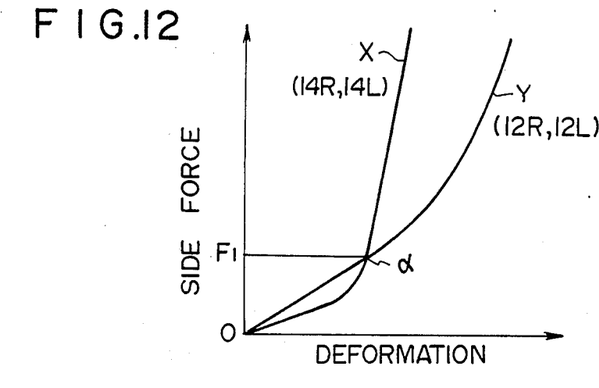

In this embodiment, the relation between the deformation of the rear bushing 14R and the magnitude of the side force acting on the rear wheel 3R is set as shown by line X in FIG. 12, and the relation between the deformation of the front bushing 12R and the magnitude of the side force acting on the rear wheel 3R is set as shown by line Y in FIG. 12. That is, the spring characteristics of the front bushing 12R is substantially linear while that of the rear bushing 14R is nonlinear. The spring characteristic curves X and Y of the rear and front bushings 14R and 12R intersect with each other at an intersection indicated at α. As can be understood from FIG. 12, when the side force acting on the rear wheel 3R is relatively small, i.e. smaller than the value F1 corresponding to the intersection α, the rear bushing 14R is deformed by a larger amount than the front bushing 12R, while when the side force acting on the rear wheel 3R exceeds the value F1, the front bushing 12R is deformed by a larger amount than the rear bushing 14R. The bushings 8R and 10R have substantially the same spring characteristics.

FIG. 13 shows the behavior of the right rear wheel 3R or the change in position of the right rear wheel 3R with the change in magnitude of the side force acting thereon due to the difference in spring characteristics between the front bushing 12R and the rear bushing 14R. In FIG. 13, the side force acting on the rear wheel 3R is indicated at F, and the positions of the rear wheel 3R when the side force is zero, when the side force is smaller than the value F1 and when the side force is larger than the value F1 are shown respectively by the solid line, the chained line and the dotted line in FIG. 13. In FIG. 13, O1, O2 and O3 respectively denote positions of the central axis (in the direction of width of the wheel) of the rear wheel 3R when the side force is zero, smaller than the value F1 and larger than the value F1. In FIG. 13, the front and rear bushings 12R and 14R are schematically represented by spring-shapes. In this embodiment, the dimensions of the parts are selected so that the side force acting on the rear wheel 3R acts uniformly on the front and rear bushings 12R and 14R.

As can be understood from FIG. 13, when the side force is zero, the rear wheel 3R is directed straight-forward. When the side force F is smaller than the value F1, the rear wheel 3R is caused to toe out by an appropriate amount so that a relatively weak understeer tendency is obtained, since the rear bushing 14R is deformed by a larger amount than the front bushing 12R as described above. When the side force F is larger than the value F1, the front bushing 12R is deformed by a larger amount than the rear bushing 14R and accordingly the degree of toe-out is reduced as compared with the same when the side force is smaller than the value F1. That is, a large side force F acts on the right rear wheel 3R during cornering to the left and accordingly the understeer tendency is enhanced by reducing the degree of toe-out, whereby abrupt reverse-steer can be prevented.

As the front bushing 12R in this embodiment, the bushing shown in FIGS. 4 and 5 (the rear bushing in the first embodiment) can be used and as the rear bushing 14R in this embodiment, the bushing shown in FIGS. 6 and 7, or the bushing shown in FIGS. 8 and 9 (the front bushing in the first embodiment) can be used.

Figure 14:
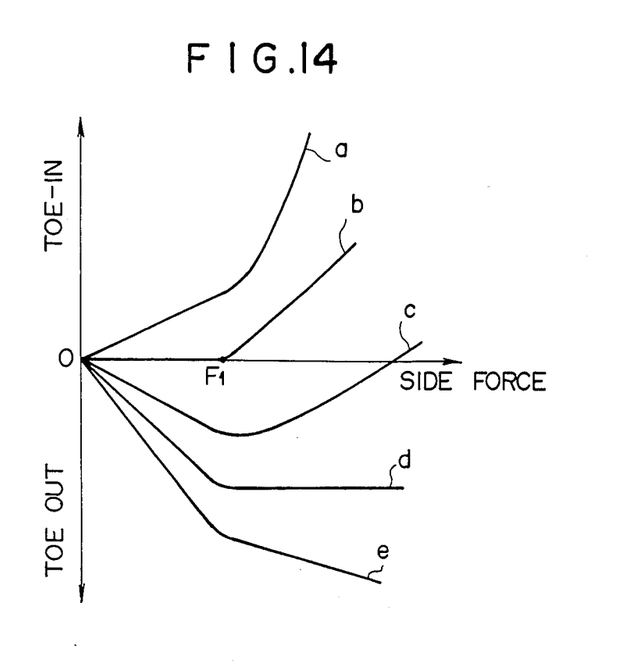

The relation between the change in position of the rear wheel 3R (i.e. the position of the rear wheel concerning toe-in or toe-out) and the running stability during straight-forward travel, and the relation between the position of the rear wheel 3R and the steering performance or prevention of the reverse-steer will be described, hereinbelow, with reference to FIG. 14. In FIG. 14, characteristic curves a to e respectively show positions of the rear wheel 3R for different spring characteristics of the front and rear bushings 12R and 14R, F1 being the magnitude of the side force F corresponding to the intersection α in FIG. 2. As can be understood from FIG. 14, when the side force acting on the rear wheel 3R exceeds the value F1, the amount of change in position of the rear wheel 3R in the direction of toe-in (in which the understeer tendency is enhanced) varies so that the degree of toe-in is larger when the side force F is large than when the side force F is small. Any one of the characteristic curves a to e may be employed. When the characteristic curve a is employed, the running stability during straight-forward travel is highly improved and prevention of abrupt reverse-steer is ensured, and thereby a car suitable for family use can be obtained. On the other hand, when the characteristic curve e is employed, the steering performance is improved more than the running stability, that is, the characteristic curve e is suitable for a sporty type car.

Figure 15:
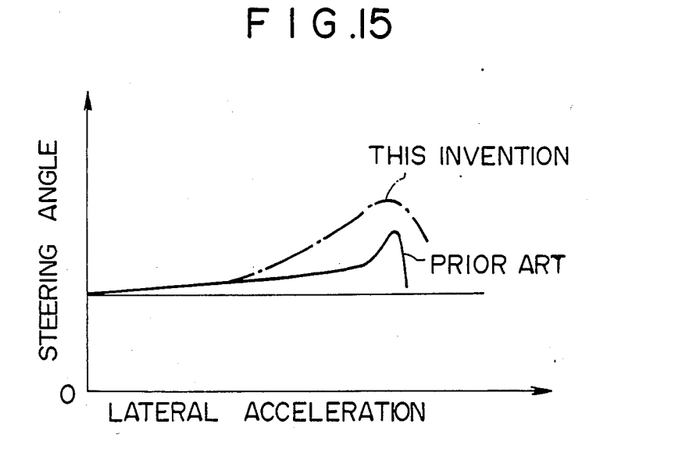

FIG. 15 shows the relation between the steering angle and the steering following properties (represented by the magnitude of the lateral acceleration) for different values of F1, the solid line representing the relevant relations of a conventional front-engine-rear-drive car, the chained line and the dotted line respectively representing the relevant relations of different front-engine-rear-drive cars in accordance with two embodiments of the present invention. As can be understood from FIG. 15, in accordance with this embodiment, the steering performance and the running stability can compromise appropriately with each other when the side force acting on the rear wheel is relatively small, and at the same time, abrupt reverse-steer can be effectively prevented when the side force becomes larger.

The concept of this embodiment can be also applied to front suspensions. In this case, the relation between the spring characteristics of the front bushing and that of the rear bushing is reversed. Further, the concept of this embodiment can be applied to vehicles other than front-engine-rear-drive cars so long as understeer tendency is weakened as the side force acting on the wheel increases.

Further, although in the first and second embodiments the present invention is applied to the swing arm type suspension, the present invention can be applied to various other suspensions such as a semi trailing arm type suspension.

Further, although in the first and second embodiments, the spring characteristics of the bushings 12R and 14R are selected with those of the bushings 8R and 10R being substantially the same, the spring characteristics of the bushings 8R and 10R may instead be selected in accordance with the concept of the present invention, or the spring characteristics of both the bushings 8R and 12R (as the front bushing), and the bushings 10R and 14R (as the rear bushing) may be selected in accordance with the concept of the present invention.

As can be understood from the above description, the concept of the present invention can be easily put into practice and can be applied to existing suspensions without substantially changing the design thereof.

I claim:

1. An automotive suspension system comprising a wheel support for supporting a wheel, and a wheel supporting member for connecting the wheel support to the vehicle body wherein the wheel supporting member includes front and rear resilient supporting means spaced from each other by a predetermined distance in the longitudinal direction of the vehicle body and the direction of the toe of the wheel is adapted to be changed according to deformation of the front and rear resilient supporting means, the load-deformation characteristics of the front and rear resilient supporting means being selected so that the ratio of the amount of deformation of the front resilient supporting means for a given load to that of the rear resilient supporting means for the same load changes according to the magnitude of external side forces acting on the wheel, thereby changing the steering characteristics according to the magnitude of external force, said deformation being that in right and left or width directions of the vehicle body caused by said side forces.

2. An automotive suspension system as defined in claim 1 in which the amount of deformation of one of the front and rear resilient supporting means for a given load is smaller than that of the other resilient supporting means when the load is smaller than a predetermined value, and the amount of deformation of said one resilient supporting means for a given load is larger than that of said other resilient supporting means when the load is larger than the predetermined value.

3. An automotive suspension system as defined in claim 2 in which the load-deformation characteristics of the front and rear resilient supporting means are selected to change the direction of the toe of the wheel so that understeer tendency is weakened when the side force acting on the wheel exceeds a predetermined value.

4. An automotive suspension system as defined in claim 3 in which said wheel is a rear wheel and the ratio of the amount of deformation of the front resilient supporting means for a given load to that of the rear resilient supporting means for the same load is larger when said external force is small than when the external force is large.

5. An automotive suspension system as defined in claim 2 in which the load-deformation characteristics of the front and rear resilient supporting means are selected to change the direction of the toe of the wheel so that understeer tendency is enhanced when the side force acting on the wheel exceeds a predetermined value.

6. An automotive suspension system as defined in claim 5 in which said wheel is a rear wheel and the ratio of the amount of deformation of the front resilient supporting means for a given load to that of the rear resilient supporting means for the same load is smaller when said external force is small than when the external force is large.

7. An automotive suspension system as defined in claim 2 in which said wheel supporting member includes at least one arm member and said front resilient supporting means is provided between at least one of the arm member and the vehicle body and between the arm member and the wheel support, and said rear resilient supporting means is provided between at least one of the arm member and the vehicle body and/or between the arm member and the wheel support.

8. An automotive suspension system as defined in claim 7 in which said arm member comprises front and rear lateral links extending in the transverse direction of the vehicle body and spaced from each other in the longitudinal direction of the vehicle body.

9. An automotive suspension system as defined in claim 8 in which the load-deformation characteristics of one of the front and rear resilient supporting means are nonlinear and those of the other resilient supporting means are linear.

10. An automotive suspension system as defined in claim 9 in which said wheel is a rear wheel and the ratio of the amount of deformation of the front resilient supporting means for a given load to that of the rear resilient supporting means for the same load is larger when said external force is small than when the external force is large.

11. An automotive suspension system as defined in claim 7 in which said front and rear resilient supporting means are disposed between the respective arm members and the wheel support.

12. An automotive suspension system as defined in claim 7 in which said resilient supporting means comprises inner and outer coaxial tubular members and a resilient rubber material body connecting the inner and outer tubular members.

13. An automotive suspension system as defined in claim 12 in which a pair of diametrically opposed hollow portions are formed in the rubber material body to extend over the entire length thereof.

14. An automotive suspension system as defined in claim 12 in which a pair of diametrically opposed central spaces is formed in the rubber material body to extend from the inner surface of the outer tubular member to the outer surface of the inner tubular member, and a pair of synthetic resin bodies is inserted into the respective central spaces, each synthetic resin body being harder than the rubber material body and being bonded to one of the inner tubular member and the outer tubular member but spaced from the other.

15. An automotive suspension system as defined in claim 1 in which the load-deformation characteristics of one of the front and rear resilient supporting means are nonlinear and those of the other resilient supporting means are linear.

16. An automotive suspension system as defined in claim 15 in which the load-deformation characteristics of the front and rear resilient supporting means are selected to change the direction of the toe of the wheel so that understeer tendency is weakened when the side force acting on the wheel exceeds a predetermined value.

17. An automotive suspension system as defined in claim 16 in which said wheel is a rear wheel and the ratio of the amount of deformation of the front resilient supporting means for a given load to that of the rear resilient supporting means for the same load is larger when said external force is small than when the external force is large.

18. An automotive suspension system as defined in claim 15 in which the load-deformation characteristics of the front and rear resilient supporting means are selected to change the direction of the toe of the wheel so that understeer tendency is enhanced when the side force acting on the wheel exceeds a predetermined value.

19. An automotive suspension system as defined in claim 18 in which said wheel is a rear wheel and the ratio of the amount of deformation of the front resilient supporting means for a given load to that of the rear resilient supporting means for the same load is smaller when said external force is small than when the external force is large.

20. An automotive suspension system as defined in claim 15 in which said wheel supporting member includes at least one arm member and said front resilient supporting means is provided between at least one of the arm member and the vehicle body and between the arm member and the wheel support, and said rear resilient supporting means is provided between at least one of the arm member and the vehicle body and between the arm member and the wheel support.

* * * * *